United States Patent [19]
Hallerbäck

[11] 3,720,914
[45] March 13, 1973

[54] ELECTRIC MOTORS

[75] Inventor: Stig Lennart Hallerbäck, Vastra, Sweden

[73] Assignee: SKF Industrial Trading and Development Company N.V., Amsterdam, Netherlands

[22] Filed: July 14, 1971

[21] Appl. No.: 162,596

[52] U.S. Cl.....................................310/43, 310/90
[51] Int. Cl................................................H02k 1/04
[58] Field of Search......310/43, 90, 91, 157, 260, 89; 417/424

[56] References Cited

UNITED STATES PATENTS

| | | | |
|---|---|---|---|
| 3,042,820 | 7/1962 | Diamond | 310/43 X |
| 3,194,166 | 7/1965 | Neidl | 310/90 X |

Primary Examiner—D. F. Duggan
Attorney—Shaw, Howson, Jr., Logan, Skillman, Dorfman, Rogers, Allen, Free, Renz, Jr., Weber, & Herrell

[57] ABSTRACT

An electric flange motor particularly for driving circulation pumps for heating systems and having the mounting flange formed as an extension of a plastic moulding encapsulating the stator windings. The flange is provided with metallic fastening means lacking metallic connection with the stator core, to minimize the transmission of heat from the pump to the motor. Rotor bearing support means are supported by the stator core independently of the plastic moulding.

10 Claims, 3 Drawing Figures

ELECTRIC MOTORS

The present invention relates to electric motors having a stator and a rotor, and more specifically to flange motors for circulation pumps such as installed in heating systems, and is particularly intended for electric motors equipped with cup-shaped bearing supports attached by the large end to the stator radially inside the end coils of the stator windings and carrying at the small end a rotor bearing and having the end coils encapsulated in a plastic moulding, this moulding extending from the stator core and being secured relative to the latter in a non-detachable manner.

Electric motors operating at a low noise level are required in many fields of use. In this respect electric drive motors for circulation pumps set up special problems on account of the resonance effects created in pumping and circulation systems. To suppress noise it is necessary to make special arrangements, such as building this type of electric motor with heavy, vibration-dampening casings of cast iron or the like and having a rigid mounting or supporting flange. A flexible rubber connection between the flange and the mating structure is often used, provided that the construction allows of such an arrangement. The increased weight of the motor entails disadvantages, such as the need for a greater quantity of material, increased manufacturing costs and higher demands on fastening devices and their dimensioning.

In modern heating systems comparatively high temperatures are employed for the circulating fluids. There will be a risk, therefore, that the heat will impair the motor windings and bearings. Further, vibration-dampening fastening means of rubber or similar material cannot be employed, as the operating temperature will be so elevated as to cause the rubber to deteriorate very rapidly. The provision of conventionally built ventilation systems for motor cooling is avoided, if possible, on account of the ensuing noise disturbances.

It is the object of invention to provide an electric motor, having a very low inherent noise level and being supported in a vibration-dampening manner, at the same time providing means for connecting it to hot mating machinery in such a way as to minimize heat transmission. The electric motor according to the invention is characterized in that the plastic moulding around the end coils of the stator windings is enlarged and is formed into mounting means for the motor, and is provided with metallic fastening means, such as sheet metal elements, lacking metallic connection with the stator core, the bearing support means being supported by the stator core independently of the plastic moulding so as to be unaffected by any deformations and dimensional variations of the latter.

For flange mounting of the motor the motor supporting means are formed into a mounting flange of a frusto-conical shape, which will afford a supporting structure of the necessary rigidity, due consideration being paid to the mechanic properties of the plastic moulding.

By forming the motor supports of a plastic moulding, a vibration-absorbing and noise-reducing effect as well as weight saving is achieved. The plastic itself, however, must not be subjected to the protracted action of substantial compressive loads, as the ensuing deformation of the plastic, especially at high temperatures, would soon untighten the prestressed connections, thus causing screw, nuts, liner sleeves etc., to become loose.

To secure the motor to any other piece of machinery fastening means of sheet metal or other metallic material are therefore required. According to the invention, these fastening means lack metallic connection with the stator core to prevent vibrations and/or heat to spread to or from the driven machinery. Special fastening elements of metal are therefore provided in the plastic moulding, such as spacers, shoulders, or specially designed plates to take up mounting loads at bolt and screw connections. In a preferred embodiment, the fastening means is a cup-shaped base member.

For electric motors with high demands on silent operation, a rigid fixation and an accurate centering and parallel adjustment of the rotor relative to the stator is important. When the supporting members for the motor are made of a plastic and the necessary metallic fastening members lack any metallic connection with the stator core, which might have given mechanic rigidity to the structure, deformations of the enlarged plastic moulding cannot be avoided. Securing the bearing supports of the rotor system to this plastic moulding in the conventional way will therefore affect adversely the journalling and centering of the rotor relative to the stator. Since the rotor, according to the invention, is supported directly from the stator core and not by the intermediary of the plastic moulding, neither deformations of the plastic moulding, which appear in the normal course of operation and are caused by heat being generated in the stator windings, nor deformations due to mechanical loads on or heat conducted to the supporting members can, therefore, influence the journalling and centering of the rotor.

By reason of the inferior heat-conducting properties of the plastic, a motor according to the invention is particularly well suited for the drive of circulation pumps. To further prevent heat from passing to the electric motor from the pump attached to the motor via the mounting flange, this flange is preferably connected to the pump in a heat-insulating manner. This can be achieved, for example, by making the specially designed spacers or metal members at the attaching points offer minimal contact surfaces between the motor and the pump. This will also facilitate the provision of heat radiation surfaces and air flow spaces between the motor flange and the mating pump member.

To improve the cooling of an electric motor according to the invention, openings for cooling air may be provided in the mounting flange and preferably also in the bearing support at each motor end as well as in the end wall of a motor casing, if such a casing is provided. By suitable shape and arrangement of the openings, a cooling air flow into the rotor chamber and out through the flange openings can be generated. Holes extending longitudinally of the rotor near its center line will facilitate the passage of air.

An electric motor according to the invention will have a low vibration and noise level. It can be connected to machinery having so elevated temperature that conventional motors cannot be used. In addition to this, the improved motor can be made with smaller overall dimensions, can operate at higher rotation speed and can absorb greater loads than conventionally built motors. Moreover, the improved motor can be built at lower cost than conventional motors for the same field of application.

The invention will be described below with reference to the drawings, in which.

Figure 1:
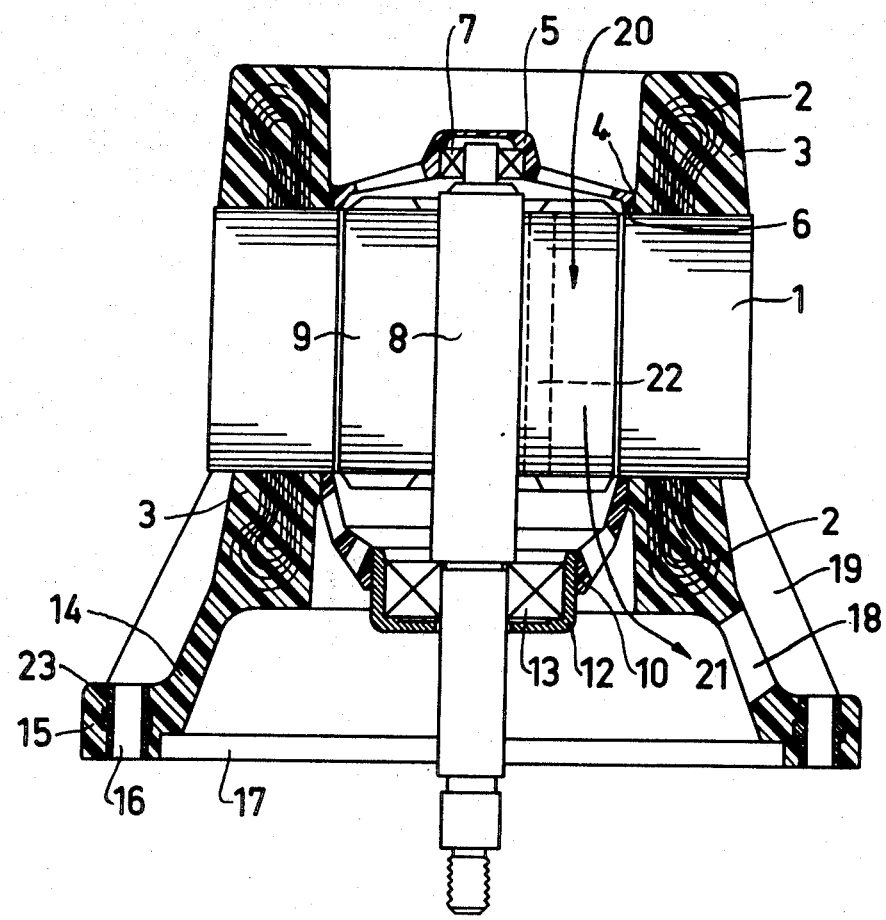
FIG. 1 is a longitudinal section view of an electric motor intended for flange mounting.

The motor illustrated in FIG. 1 comprises a stator core 1 with stator windings 2. The windings are embedded in a plastic moulding 3, preferably highly heat-resistant. The upper bearing support 5 is centered against the moulding as at 4, and has an end surface 6 abutting the stator core 1. At its hub portion, the bearing support 5 accommodates a rolling bearing 7 (such as a ball bearing) for the rotor shaft 8 with the rotor 9. The lower bearing support 10 is like bearing support 5 guided coaxially to the stator cavity by the plastic moulding surrounding the windings. The bearing support 10 has a hub portion shaped into a bearing housing 12, accommodating a further rolling bearing 13 for rotor shaft 8. The moulding 3 surrounding the windings 2 is extended downward into a frusto-conical flange 14, formed with a moulded plastic rim 15 pierced by mounting holes 16. These holes 16 are provided with rigid metallic liners 23 for the bolts connecting the motor to the machinery to be driven (not shown). A guide surface 17 is formed inside the rim 15 for centering purposes. The frusto-conical flange 14 has a number of cooling holes 18 and integral stiffening ribs 19. On account of the shape of the bearing supports and the cooling openings, cooling air is forced to pass through the rotor chamber as indicated by arrows 20 and 21. One out of several symmetrically disposed air conduits through the rotor and near the center line thereof is denoted 22.

Figure 2:
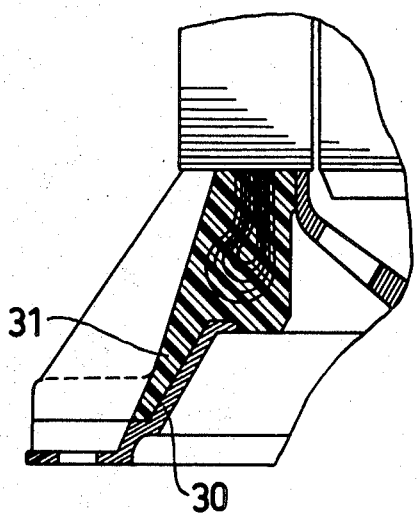
FIG. 2 is a fragmentary section view of a flange motor with specially moulded in mounting members.
Figure 3:
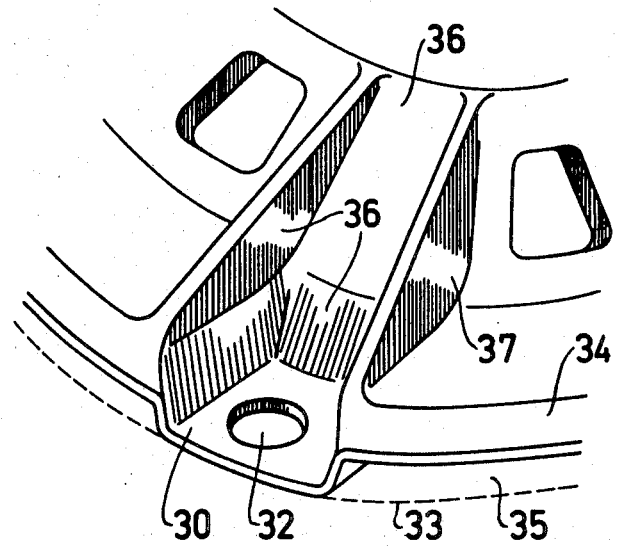
FIG. 3 is a fragmentary perspective view of the motor according to FIG. 2.

FIG. 2 illustrates a metallic fastening member or lining 30 bonded to the enlarged frusto-conical portion 31 of the plastic moulding surrounding the windings. FIG. 3 illustrates more detailed how the fastening member 30 with mounting hole 32 is formed so as to leave a space 35 between a mating surface 33 and the moulded flange 34. This space allows air flow between the flange and the surface 33 which belongs to the driven machinery such as a circulation pump for a hot fluid. The heat conducted from the surface 33 via the mounting bolts and the abutment surface 30 will be dissipated by radiation from the cooling surfaces 36. These cooling surfaces may be formed of metallic extensions of the fastening member 30 or may be ribs 37 formed integrally with the moulded flange.

Many different types of fastening members may, of course, be used, but a characteristic feature for all of them is that they offer but small areas for the heat passing from the area of contact with the driven machinery, whereas ample cooling surfaces are provided for dissipating the heat by radiation. Further, air spaces are provided between the area of contact with the driven machinery and the mounting flange.

I claim:

1. An electric motor comprising a stator and a rotor and provided with cup-shaped bearing support means, said bearing support means being by its larger end secured relative to the stator radially inside the end coils of the stator windings and accommodating a rotor bearing at its smaller end, the end coils of the stator windings being embedded in a plastic moulding forming an extension of the stator core and bonded to the latter, characterized in that the said plastic moulding is enlarged and formed into mounting means for the motor, and is provided with metallic fastening means, such as sheet metal elements, lacking metallic connection with the stator core, the bearing support means being supported by the stator core independently of the plastic moulding so as to be unaffected by any deformations and dimensional variations of the latter.

2. An electric motor according to claim 1, characterized in that the mounting means for the motor are shaped into a substantially frusto-conical mounting flange.

3. An electric motor according to claim 2, characterized in that the mounting flange and/or the fastening means are formed and arranged so as to admit of a heat-insulating connection with machinery to be driven by the motor.

4. An electric motor according to claim 3, characterized in that the mounting flange and/or the fastening means is provided with but a small member and/or small surface area for connecting the motor to machinery to be driven thereby.

5. An electric motor as claimed in claim 1 wherein said mounting means comprises a frusto-conical flange and said fastening means is mounted at the large end of said frusto-conical flange and forms a cup-shaped base member.

6. An electric motor as claimed in claim 5 wherein the base member is provided with metallic cooling surfaces in contact with the ambient air.

7. An electric motor as claimed in claim 1 wherein the mounting means comprises a frusto-conical flange and including a plurality of cooling air openings in said flange.

8. An electric motor as claimed in claim 7 wherein said flange is provided with a plurality of circumferentially spaced stiffening ribs.

9. An electric motor as claimed in claim 1 wherein said bearing supports are provided with cool air openings and wherein said mounting means is provided with cooling holes and said stator is designed to generate a cooling air flow into and through the rotor chamber through the air openings and holes in the bearing supports and mounting flange.

10. An electric motor as claimed in claim 1 wherein the plastic molding surrounding the stator windings and enlarged into mounting and fastening means comprises a high temperature resistant plastic material.

* * * * *